Jan. 24, 1961 — W. L. PERRINE — 2,968,945
FLOW METER
Filed Dec. 15, 1955 — 6 Sheets-Sheet 1

INVENTOR.
WARREN L. PERRINE
BY
ATTORNEY

FIG. 3

INVENTOR.
WARREN L. PERRINE
BY
*Theodore H. Lavagne*
ATTORNEY

Jan. 24, 1961  W. L. PERRINE  2,968,945
FLOW METER
Filed Dec. 15, 1955  6 Sheets-Sheet 5

INVENTOR.
WARREN L. PERRINE
BY
Theodore H. Lavagne
ATTORNEY

United States Patent Office

2,968,945
Patented Jan. 24, 1961

2,968,945

FLOW METER

Warren L. Perrine, Pasadena, Calif., assignor to General Precision, Inc., a corporation of Delaware Filed Dec. 15, 1955, Ser. No. 553,382

12 Claims. (Cl. 73—206)

This invention relates to integrating apparatus and more particularly to apparatus for converting a pair of input quantities into particular functions such as square roots of the input quantities and for integrating these particular functions with respect to an independent quantity such as time. The embodiment of the invention is adapted to provide instantaneous and continuous measurements as to the amount of fluid flowing past an orifice.

With the advent of automation, controlled flow of fluids such as gases is often necessary. As a first step in controlling the flow of fluid, the amount of fluid flow at any instant must be measured. One way of measuring the flow of fluid is to measure the pressure of the fluid in a pipe at any instant and to convert the pressure into a particular function such as a square root value. In addition to measuring the pressure of the fluid at any instant, the drop in the pressure of the fluid across an orifice is also measured. This drop in pressure is converted into a particular function such as a square root value. The square root values of the fluid pressure and the drop in fluid pressure are then integrated with respect to an independent quantity such as time to obtain values directly related to the amount of fluid flow.

A number of attempts have been made to measure the flow of fluid in the manner described above. The apparatus resulting from these attempts has been disadvantageous for several reasons. One reason has been that the apparatus has measured the flow of fluid on an intermittent basis and has used these intermittent measurements to obtain average values of the fluid flow between successive measurements. Since the flow of a fluid can vary quite considerably on an instantaneous basis, the use of averaging techniques can sometimes lead to considerable errors. Another disadvantage has resulted from the requirement in many types of apparatus that amplifiers be used to build up the drop in pressure across the orifice. Such amplification in the drop in pressure has been required in order to obtain indications of any accuracy from the apparatus.

This invention provides apparatus which overcomes the above disadvantages. The apparatus constituting this invention includes a first input shaft rotatable through an angle representing the pressure of the fluid flowing through a pipe. A first plate is coupled to the input shaft through an arm and a linkage so as to be moved in accordance with the rotation of the input shaft. The plate is also coupled to second and third linkages for pivotal movements in opposite directions at a pair of spaced positions. Because of the pivotal movements of the plate in opposite directions at a pair of spaced positions, the plate has a linear movement at an intermediate position between the spaced positions.

A pair of balls follow the linear movements of the plate at the intermediate position. These linear movements of the balls control the relative movement of a pair of gears or discs in spaced relation to each other and with the balls positioned therebetween. One of the gears is driven at a substantially constant speed to represent an independent quantity such as time. This gear or disc, broadly defined as a rotary member, in turn drives the balls at a speed related to its own angular movements and to the radial positioning of the balls on the gear or disc. The balls in turn drive the second gear or disc.

By positioning the second disc a particular radial distance from the first disc, the angular movements of the second disc can be made to approximate a particular function such as the square root of the fluid pressure. The approximation can be made to a high degree of accuracy by driving the plate through the arm and the first linkage from the first input shaft.

A second input shaft is rotatable through an angle representing the drop in pressure experienced by the fluid in flowing through an orifice. This input shaft in turn drives a second plate through a second arm and a fourth linkage corresponding to the first arm and the first linkage. The second plate is also coupled to fifth and sixth linkages for pivotal movements in opposite directions at a pair of spaced positions and for linear movement at an intermediate position between the spaced positions.

The second plate carries at the intermediate position a second pair of balls such that the balls follow the linear movements of the plate. The linear movements of the balls correspond to radial movements of the balls with respect to third and fourth gears or discs with the balls disposed therebetween. The third gear or disc is driven by the second gear or disc to receive a motion related to the square root of fluid pressure. The third gear or disc in turn drives the balls through angular distances related to the angular movements of the third disc and to the radial positioning of the balls relative to the disc. This angular movement of the balls is transmitted to the fourth disc. The fourth disc is positioned a particular radial distance from the third disc.

Because of the particular positioning of the fourth disc, the angular movements of the fourth disc can be made to represent the fluid flow at any instant. In this way, the fluid flow is obtained in the apparatus constituting this invention by determining the square root values of the fluid pressure and the drop in fluid pressure across an orifice and by integrating these values with respect to time. The apparatus obtains these values on a continuous and instantaneous basis and without any need for amplification of the input signals.

In the embodiment of the invention shown in the drawings, a casing 10 (Figures 1 and 4) made from a suitable transparent material such as glass is adapted to be secured to a bottom retainer 12 to form an enclosure. A gasket 14 (Figures 4, 6, 8 and 9) made from a suitably resilient material such as rubber is positioned between the casing 10 and the retainer 12 to absorb shocks. A shaft 16 (Figures 1, 3 and 4) extends through the bottom retainer 12 and through a sleeve 18 for rotation relative to the retainer and the sleeve. The shaft 16 carries a gear 20 (Figures 3 and 4) as by seating the gear on the shoulder of a bushing 22. The bushing 22 is adjustably mounted in fixed position on the shaft 16 as by a set screw 24 which extends through the bushing to a position frictionally engaging the shaft.

Figures 1, 2:
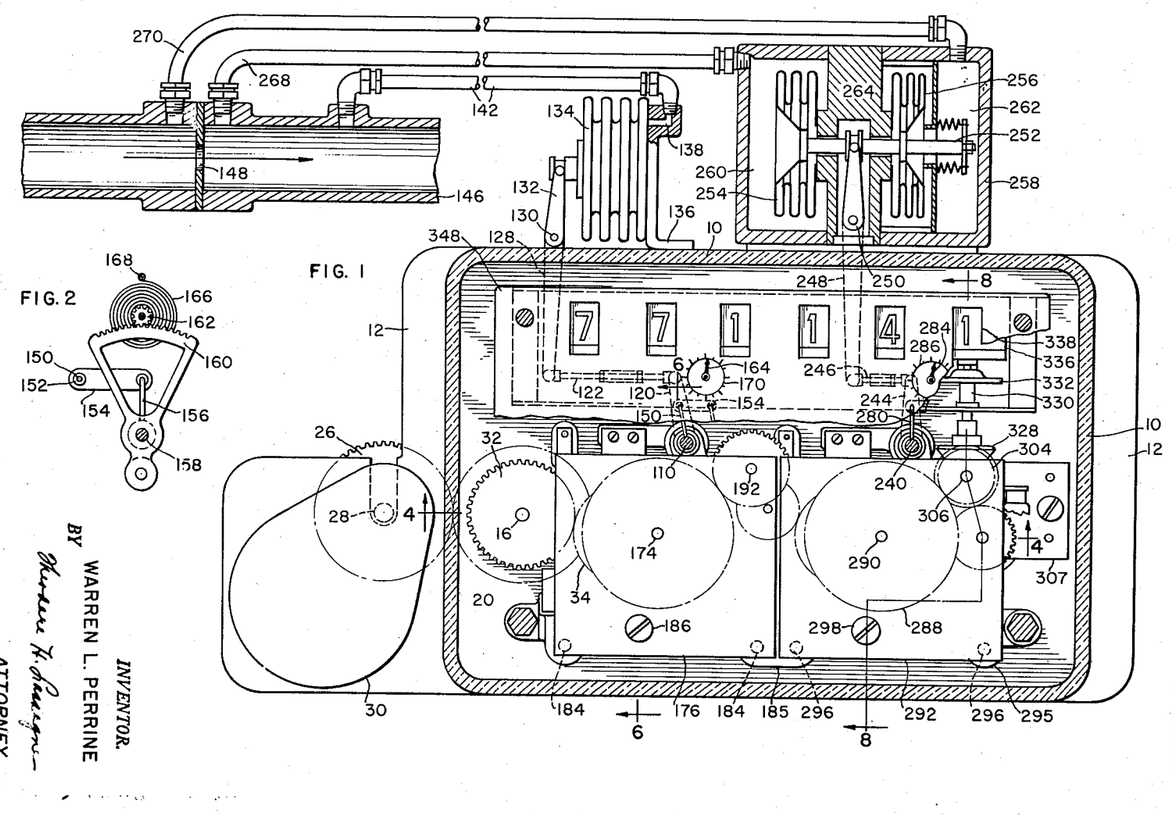
Figure 1 is a somewhat schematic plan view illustrating, at least partially in section, apparatus for measuring fluid pressure and the drop in fluid pressure across an orifice and integrating apparatus for converting the measurements into particular functions such as square root values and for integrating these functions with respect to variations in an independent quantity such as time.
Figure 2 is an enlarged view of certain members shown in Figure 1 as seen from a position corresponding to that of Figure 1 and illustrates these members in detail.

The gear 20 is in mesh with a gear 26 (Figures 1, 3 and 4) mounted on a shaft 28 for rotation by a motor 30 (Figure 1). The motor 30 may be a suitable motor such as of the synchronous type to drive the shaft 28 and the gear 26 at a substantially constant speed to represent an independent quantity such as time. The gear 26, the shaft 28 and the motor 30 are adapted to be supported by a portion of the bottom retainer 12 extending beyond the casing 10.

Figure 3:
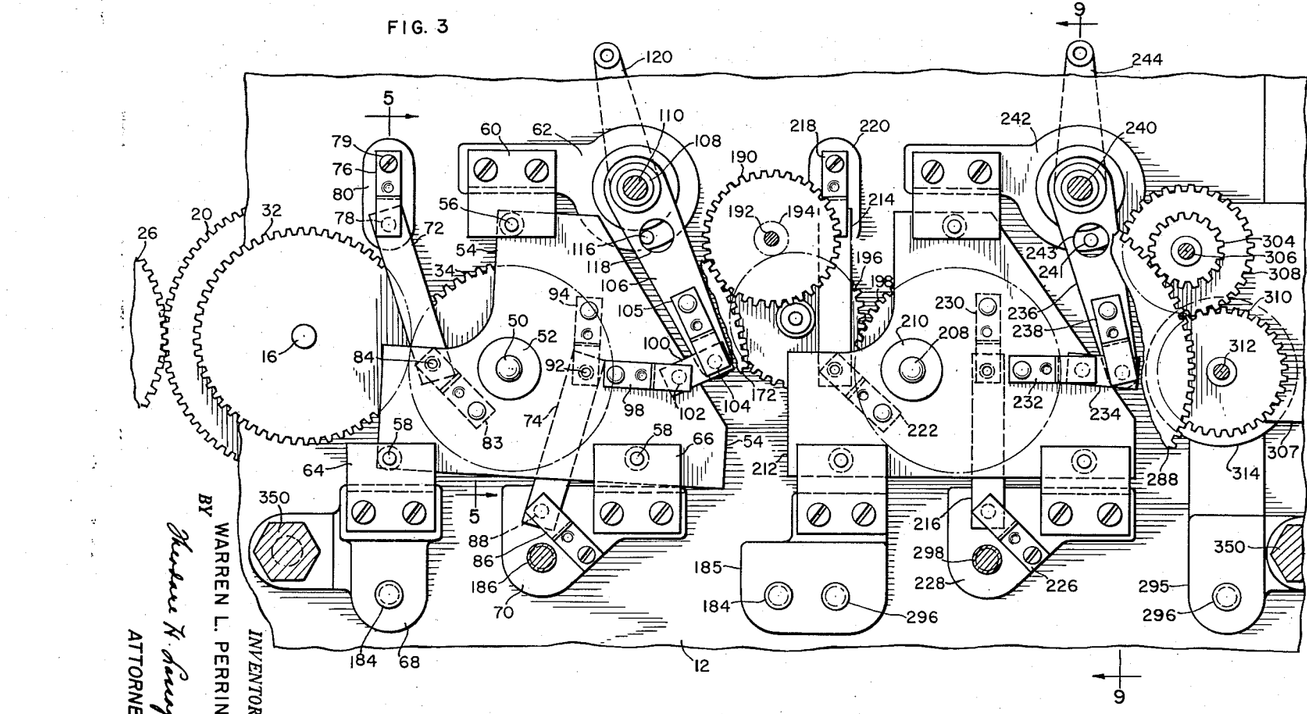
Figure 3 is an enlarged fragmentary sectional view taken substantially on the line 3—3 of Figure 4 and illustrates the apparatus in further detail.
Figure 4:
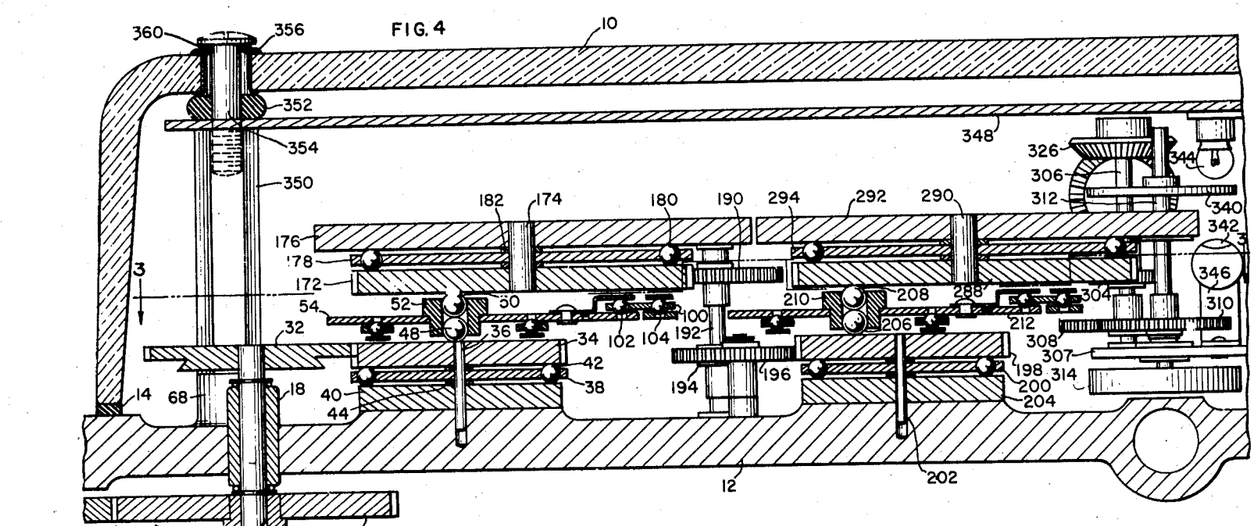
Figure 4 is an enlarged fragmentary sectional view of the integrating apparatus and is taken substantially on the line 4—4 of Figure 1.

A gear 32 (Figures 3 and 4) is mounted on the shaft 16 and is in mesh with a gear or disc 34 rotatable on a pin 36 (Figure 4). As may be best seen in Figures 14 and 15, the gear 34 has a pair of notches 37 at diametrically opposed positions in the upper face of the gear. The notches 37 are disposed at positions adjacent to the pin 36 and are provided with increasing depths with progressive distances toward the pin.

The upper surface of the pin 36 is flush in the vertical direction with the upper face of the gear 34 on the side of the gear closest to the balls 48 and 50. The upper surface of the pin 36 tapers downwardly at a relatively shallow angle from the position at which the pin is flush with the gear 34. This taper is indicated at 39 in Figure 14. Since the upper surface of the pin 36 is tapered, the upper surface of the pin can be aligned with the upper face of the gear 34 at one position. The pin 36 and gear 34 can then be rotated together to a position at which the line between the centers of the ball 48 and the pin 36 extends through the position of vertical alignment between the pin and the gear.

The pin 36 extends through the gear 34 (Figure 4), a cage 38 and a mounting plate 40 into a socket in the bottom retainer 12 for fixed positioning in the retainer. The mounting plate 40 is fixedly positioned on a platform of the retainer 12 and is provided with a smooth surface on its upper plate to present a relatively frictionless surface for the rotation of a plurality of balls 42. The balls 42 are disposed in sockets in the cage 38 at spaced intervals around the periphery of the socket. The balls 42 contact the gear 34, which is disposed above the cage 38 and which is provided with faces having smooth surfaces to minimize friction with the members contacting it and forms a disc with gear teeth about its periphery. Spacers 44 may be disposed on the pin 36 at positions above and below the cage 38 to maintain a proper contact between the balls 42 and the mounting plate 40 and the gear 34. Instead of providing the spacers 44, the lower face of the gear 34 and the upper face of the mounting plate 40 may be provided with nipples to obtain the proper contact between the balls 42 and the mounting plate and the gear.

A first ball 48 (Figure 4) is disposed above the gear 34 and in contact with the upper face of the gear. The ball 48 is in turn disposed below and in rolling contact with ball 50 to transmit its motion to the ball 50. The balls 48 and 50 are supported within an annular sleeve 52, which is provided with a suitable inner diameter so as to lightly contact the balls. The sleeve 52 may be made from a suitable material such as Teflon or nylon having soft and resilient properties to minimize friction between it and the balls 48 and 50.

The sleeve 52 may also be made from a suitable material such as aluminum lined at its inner surface with a thin layer of Teflon. The hole in the aluminum portion of the sleeve 52 may be chamfered at its upper end to retain the Teflon lining in fixed positioning within the hole. Producing the sleeve 52 from aluminum lined with Teflon is desirable since it tends to limit the amount of deformation which can occur in the Teflon by the pressure of the balls 48 and 50 against the Teflon. This deformation results from cold flow of the Teflon.

The sleeve 52 has a shoulder which rests on a plate 54. As best seen in Figure 3, the plate 54 is provided with a somewhat triangular configuration and is slidably disposed between a pair of guide members 56 (Figure 3) near the apex of the triangular configuration and by pairs of guide members 58 (Figures 3 and 6) disposed near the corners of the legs. The guide members 56 are disposed between the plate 54 and guide plates 60 (Figure 3). The guide plates 60 are suitably supported as by screws from a boss 62 (Figures 3 and 6) which extends upwardly from the bottom retainer 12. In like manner, the guide members 58 are respectively disposed between the plate 54 and guide plates 64 and 66 (Figure 3) suitably supported as by screws from bosses 68 and 70, which extend upwardly from the bottom retainer 12. The boss 70 may be formed from a relatively soft material such as aluminum.

Figure 5:
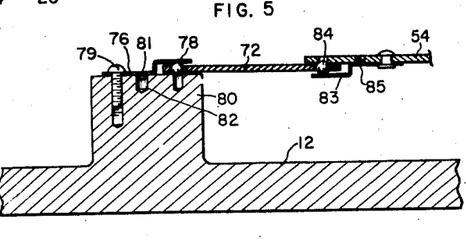
Figure 5 is an enlarged fragmentary sectional view taken substantially on the line 5—5 of Figure 3 and illustrates in further detail certain members shown in Figure 3.
Figure 7:
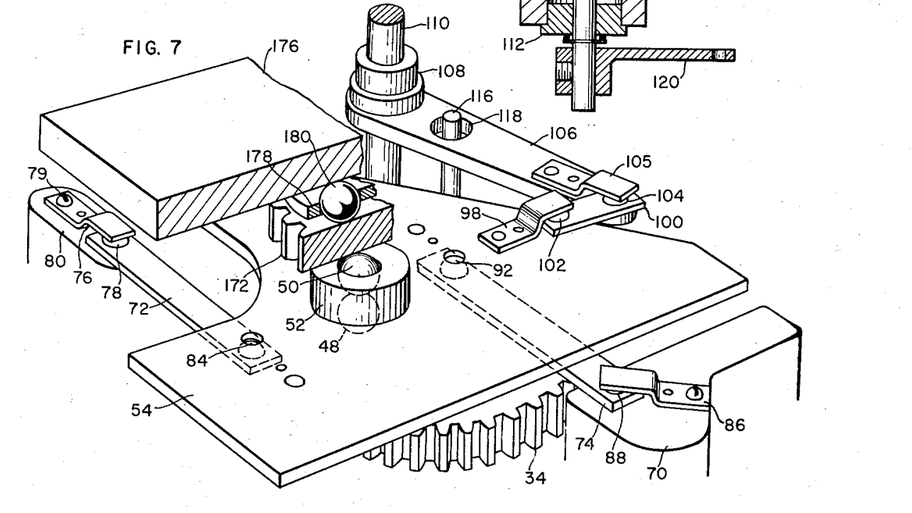
Figure 7 is an enlarged fragmentary perspective view somewhat schematically illustrating the interrelationship between important components in the integrating apparatus shown in Figures 1 to 6, inclusive, as seen from a position above and in front of the components and with certain components broken away for purposes of clarity.

The movements of the plate 54 are controlled in part by a pair of pivotable linkages 72 and 74 (best seen in Figures 3, 5 and 7). The linkage 72 is pivotably supported at one end as by a spring member 76 (Figures 3, 5 and 7) and a ball 78 extending from the spring member through a socket in the linkage. The spring member 76 is made from a suitable material so as to press downwardly against the ball 78, which in turn extends through a socket in the linkage 72 to fixedly position the linkage against any movement except a pivotal movement. The spring member 76 is secured as by a screw 79 to a boss 80 extending upwardly from the bottom retainer 12. The spring member 76 is provided at an intermediate position with a nipple 81 (Figure 5) which extends downwardly into a socket 82 in the boss 80. The insertion of the nipple 81 into the socket 82 provides a stabilizing action on the spring member 76 to prevent the spring member from rotating about the screw 79 as a pivot.

At the other end, the linkage 72 is pivotably supported as by a spring member 83 (Figures 3, 5 and 7) and a ball 84 in a manner corresponding to the support provided by the spring member 76 and the ball 78. The spring member 83 is suitably attached to the plate 54 as by a rivet. At an intermediate position, the spring member 83 is provided with a nipple 85 which extends into a socket in the plate 54 to prevent the spring member from pivoting.

In like manner, the linkage 74 is pivotably supported at one end as by a spring member 86 (Figure 3) and a ball 88. The spring member 86 is attached as by screws to the boss 70 which extends upwardly from the bottom retainer 12. At its opposite end, the pivotable movement of the linkage 74 is controlled by a ball 92 and a spring member 94 suitably attached as by a rivet to the plate 54. The spring members 86 and 94 may be respectively constructed in a manner similar to that described above for the spring members 76 and 83.

The distance along the linkage 72 between the balls 78 and 84 corresponds substantially to the distance along the linkage 74 between the balls 88 and 92. Furthermore, the horizontal distance between the center of the ball 84 and the centers of the balls 48 and 50 corresponds substantially to the horizontal distance between the ball 92 and the centers of the balls 48 and 50. The horizontal distances between the balls 84 and 92 and the centers of the balls 48 and 50 may be approximately 0.38 inch. By disposing the linkages 72 and 74 in opposite directions along the plate 54 and at substantially equal horizontal distances from the balls 48 and 50, a substantially linear movement is imparted to the plate 54 at the position of the balls. This will be described in detail subsequently.

A spring member 98 (Figures 3 and 7) is also attached as by a rivet to the plate 54 at a position near the linkage 74. At its free end, the spring member 98 is positioned above a linkage 100 to maintain a ball 102 within a socket at one end of the linkage. The linkage 100 also has a second socket at its other end for receiving a ball 104 which is pressed downwardly into the socket by spring member 105. The spring member 105 is attached at its other end to an arm 106 as by a rivet. The linkage 100 is provided with a relatively short pivotal length such as approximately 0.19 inch between the centers of the balls 102 and 104.

A bushing 108 (Figure 6) is fixedly secured to the other end of the arm 106. The bushing 108 is carried by a shaft 110 such that the bushing and the arm 106 are movable with the shaft. The arm 106 may be provided with an effective pivotal length such as approximately 0.95 inch between the centers of the ball 104 and the shaft 110. Sleeves 112 are also mounted on the shaft 110 at spaced positions and are adapted to be stationary while the shaft rotates. The sleeves 112 are push fit into the opposite ends of a socket 114 provided in the boss 62 of the retainer 12. A pin 116 (Figures 3 and 6) also extends upwardly from the boss 62 into a hole 118 in the arm 106 to limit the pivotal movements of the arm. The hole 118 is disposed in the arm 106 at an intermediate position between the ball 104 and the shaft 110.

An arm 120 (Figures 1, 3 and 6) extends from the shaft 110 in a direction opposite to that of the arm 106. The arm 120 is in turn pivotably coupled to one end of a drive rod 122 (Figure 1) movable in a direction substantially to the left or right in Figure 1. The rod 122 is pivotably connected at its other end to a linkage 128 pivotable on a pin 130. An arm 132 is also pivotable at one end on the pin 130 and at the other end is suitably attached as by a stud to a bellows 134. The bellows 134 is suitably attached as by a bracket 136 to the bottom retainer 12. The bellows 134 has a port 138 adapted to communicate through a fitting with one end of a pipe 142. The pipe 142 in turn communicates with a pipe 146 on the downstream side of an orifice 148 in the direction of fluid flow through the pipe 146. The direction of fluid flow through the pipe is indicated by an arrow in Figure 1.

A rod 150 (Figures 1, 2 and 6) extends at one end through a hole in the shaft 110 and at the other end extends into a ball 152. The ball 152 is seated in a socket at one end of a linkage 154. The other end of the linkage 154 is coupled to an arm 156 (Figure 2) to produce a pivotal movement of the arm on a pin 158. A gear sector 160 is fixedly mounted on the pin 158 to pivot in accordance with the rotary movements of the pin. The gear sector 160 has at its free end a plurality of teeth adapted to mesh with the teeth of a pinion 162. The radius of the pinion 162 is considerably less than that of the gear sector 160.

The pinion 162 (Figure 2) and a pointer 164 (Figure 1) are fixedly mounted on a shaft such that the rotary movements of the gear can be converted to pivotal movements of the pointer. The pointer 164 is pivotable against the action of a spiral hairspring 166 (Figure 2) fastened at its outer end to a fixed pin 168 and fastened at its inner end to the shaft on which the pinion 162 and the pointer 164 are mounted. The pointer 164 is included in a meter 170 (Figure 1) which is calibrated to indicate a particular function of the input quantity such as the square root of the pressure of the fluid flowing through the orifice 148 in the pipe 146.

As may be best seen in Figure 4, the ball 50 contacts the lower face of a gear or disc 172. The faces of the gear or disc 172 are preferably provided with high degrees of smoothness so that the gear can easily follow the rotary movements of the ball 50. The gear 172 is mounted on a shaft 174 which extends downwardly from a support plate 176 for rotary movement relative to the plate. The plate 176 may be formed from a relatively hard material such as steel for reasons which will be described in detail subsequently. The center of the shaft 174 is separated from the center of the pin 36 by a particular distance which will be described in detail subsequently.

A cage 178 is disposed between the gear 172 and the plate 176 and is provided with sockets at spaced intervals for holding a plurality of balls 180. Spacers 182 are disposed on the shaft 174 at opposite sides of the cage 178 to provide optimum contacts between the balls 180 and the gear 172 and between the balls 180 and the plate 176. Instead of the spacers 182, the lower face of the plate 178 and the upper face of the gear 172 may be provided with nipples to maintain optimum contact between the balls 180 and the plate and gear.

As may be best seen in Figure 1, the plate 176 is positioned above the bosses 62, 68 and 70. The plate 176 rests on a pair of spaced balls 184 (Figures 1 and 6) disposed in sockets in the boss 68 and a boss 185. The bosses 68 and 185 may be made from a relatively soft material such as aluminum for reasons which will be described in detail subsequently. A screw 186 (Figure 6) extends through the plate 176 into a tapped hole in the boss 70 such that the screw can be adjustably positioned in height above the plate and the boss. A helical spring 188 is coiled on the screw 186 and is maintained under compression between the head of the screw and the plate.

Figure 6:
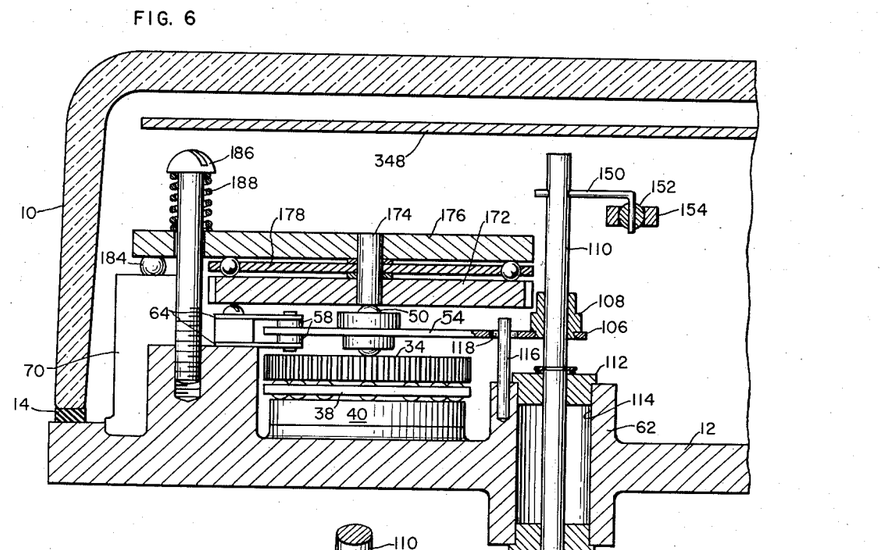
Figure 6 is an enlarged fragmentary sectional view taken substantially on the line 6—6 of Figure 1 and illustrates in further detail certain members shown in Figure 1 and other views.

Since the spring 188 is maintained under compression, it operates to pivot the plate 176 in a clockwise direction in Figure 6. The rotational force exerted against the plate 176 can be varied by adjusting the positioning of the screw 186 so as to produce corresponding variations in the compressional force exerted by the spring. In this way, the force exerted by the plate 176 through the balls 180 against the gear 172 can be varied so as to produce the proper frictional contact for producing an optimum response of the gear to the rotary movements of the ball 50.

The gear 172 is in mesh with a gear 190 (Figures 3 and 4) mounted on a shaft 192. A gear 194 is also mounted on the shaft 192 and is in mesh with a gear 196. The gear 196 in turn engages a gear or disc 198 to drive the gear in accordance with its own rotary movements. The gear 198 and a cage 200 (Figure 4) are mounted on a pin 202 for rotary movements relative to the pin. The gear 198 and the pin 202 may be constructed in a manner similar to that shown in Figures 14 and 15 for the gear 34 and the pin 36. The pin also extends through a mounting plate 204 into a platform extending upwardly from the bottom retainer 12. The gear 198, the cage 200, the pin 202 and the mounting plate 204 respectively correspond in construction to the gear 34, the cage 38, the pin 36 and the mounting plate 40.

Balls 206 and 208 are positioned on the gear 198 in cooperative relationship with each other and are disposed within a sleeve 210 made from a suitable material such as nylon or Teflon, or made from a material such as aluminum lined with nylon or Teflon at its inner surface. The balls 206 and 208 and the sleeve 210 respectively correspond to the balls 48 and 50 and the sleeve 52 described fully above and shown in Figure 4. The sleeve 210 is positioned within a socket in a plate 212 having a configuration corresponding to that shown in Figure 4 and described above for the plate 54.

The movements of the plate 212 are controlled in part by a pair of linkages 214 and 216 (best seen in Figure 3). The linkage 214 is coupled at one end to a spring member 218 suitably attached to a boss 220 which extends upwardly from the bottom retainer 12. At the other end, the linkage 214 is coupled to a spring member 222 suitably attached to the plate 212. The linkage 214 may be coupled by balls to the spring members 218 and 222 in a manner similar to that described above for the linkage 72 and the spring members 76 and 83.

The linkage 216 is coupled at one end to a spring member 226 suitably attached as by screws to a boss 228 which extends upwardly from the bottom retainer 12. At its other end, the linkage is coupled to a spring member 230 which is suitably attached to the plate 212 as by a rivet. The linkage 216 has an effective pivotal length substantially equal to the effective pivotal length of the linkage 214. The effective pivotal lengths of the linkages 214 and 216 may correspond substantially to those described above for the linkages 72 and 74. The separation between the linkages 214 and 216 at their positions of coupling to the spring members 222 and 230 may correspond to the separation between the linkages 72 and 74 at the position of coupling of these linkages to the spring members 83 and 94.

A spring member 232 is also attached as by a rivet to the plate 212. The spring member 232 is coupled as by a ball to a linkage 234 at its free end. The linkage 234 is in turn coupled to an arm 236 (Figures 3 and 9) as by a spring member 238 attached at one end to the arm and coupled at the other end to the linkage as by a ball. The arm 236 is mounted on a shaft 240 for pivotal movements with the shaft as the shaft rotates.

The spring member 232, the linkage 234, the arm 236, the spring member 238 and the shaft 240 respectively correspond in construction to the spring member 98, the linkage 100, the arm 106, the spring member 105 and the shaft 110. The linkage 234 and the arm 236 have effective pivotal lengths corresponding respectively to those described above the linkage 100 and the arm 106.

The pivotal movements of the arm 236 are limited by a pin 241 extending upwardly from a boss 242 through a hole 243 in the arm.

The shaft 240 is suitably supported by the boss 242 (best seen in Figures 3 and 9) for rotation relative to the boss in a manner similar to the relationship described above and shown in Figure 6 for the shaft 110 and the boss 62. An arm 244 (Figures 1, 3 and 9) is attached to the shaft 240 for pivotal movement in accordance with the rotation of the shaft. The arm 244 is in turn pivotably coupled to one end of a drive rod 246 (Figure 1) connected at the other end to a linkage 248. The linkage 248 is in turn pivotable about a pin as a fulcrum and an arm 250 is also pivotable about the pin.

The arm 250 is attached at its free end to a drive rod 252 coupled at opposite ends to the extremities of a pair of adjacent bellows 254 and 256. The bellows 254 and 256 are disposed within a housing 258 separated into a pair of substantially equal compartments 260 and 262 as by a wall 264. Pipes 268 and 270 respectively communicate at one end with the compartments 260 and 262. At the other end, the pipes 268 and 270 communicate with the pipe 146 at the upstream and downstream sides, respectively, of the orifice 148 in the pipe.

A rod 280 (Figure 9) extends through a hole in the shaft 240 in a manner similar to the relationship described above and shown in Figure 6 for the rod 150 and the shaft 110. The rod 280 is in turn coupled to a linkage 282 corresponding to the linkage 154. The linkage 282 in turn drives a pointer 284 in a pivotal movement through a plurality of intermediate members similar to those shown in Figures 1 and 2 and including the linkage 154, the arm 156, the gear sector 160 and the pinion 162. The pointer 284 is included in a meter 286. The meter 286 is calibrated to indicate a particular functional relationship such as the square root of the drop in fluid pressure across the orifice 148 in accordance with the pivotal movements of the pointer.

As best seen in Figure 4, the ball 208 contacts a gear 288 to drive the gear in accordance with its own angular movements. The gear 288 mounted on a shaft 290 is separated from the pin 202 by a particular horizontal distance which will be described in detail subsequently. The shaft 290 extends downwardly from a plate 292 through a cage 294. A plurality of balls are supported in sockets in the cage 294 between the plate 292 and the gear 288 to obtain a rotary movement of the gear relative to the plate. The plate 292 may be made from a relatively hard material for reasons which will be described in detail subsequently.

Figure 8:
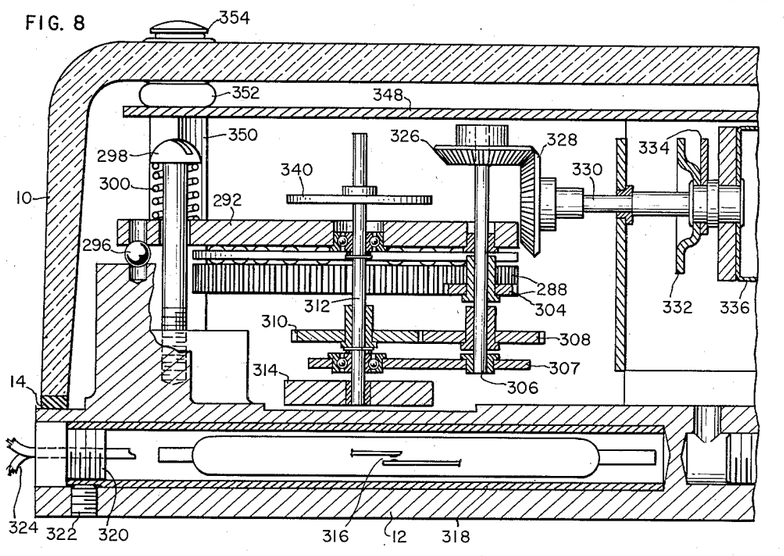
Figure 8 is an enlarged fragmentary sectional view taken substantially on the line 8—8 of Figure 1 and illustrates in further detail certain members shown in Figure 1 and in other views.
Figures 9, 14, 15:
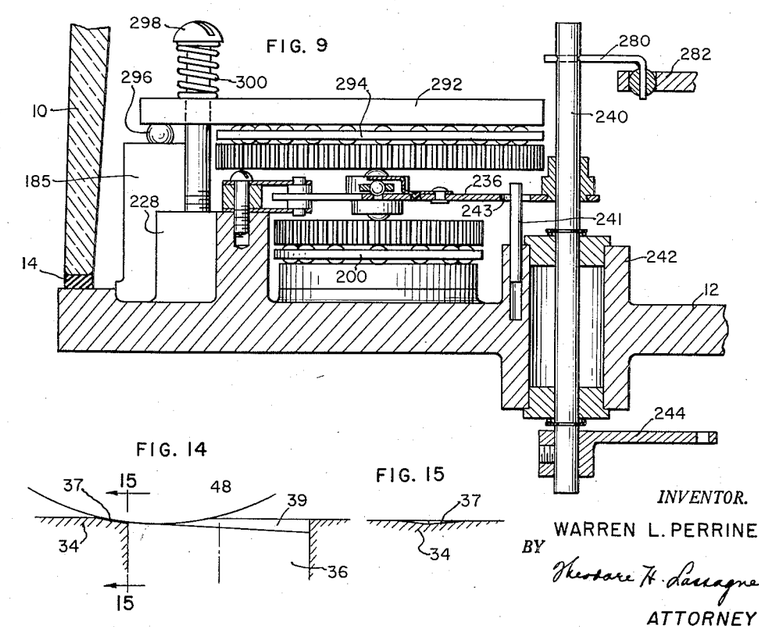
Figure 9 is an enlarged fragmentary sectional view taken substantially on the line 9—9 of Figure 3.
Figure 14 shows the construction of the stationary shaft supporting the driven plate.
Figure 15 illustrates how the plate is bevelled to provide a smooth clutch action.

As may be best seen in Figures 1 and 9, the plate 292 is positioned above the bosses including the bosses 228 and 242, which may be made from a soft material such as aluminum. The plate 292 rests on a pair of spaced balls 296 (Figures 1, 8 and 9) disposed in sockets in the plate and in the bosses 185 and 295. A screw 298 (Figures 8 and 9) extends through the plate 292 into a tapped hole in the boss 228 for adjustable positioning relative to the plate and the boss. A spring 300 is disposed on the screw 298 and is positioned between the head of the screw and the plate 292 to exert a pivotal movement on the plate 292 in a clockwise direction in Figures 8 and 9. The pivotal force exerted by the spring 300 can be varied by adjusting the position of the screw 298.

The gear 288 engages a gear 304 (Figure 8) mounted on a shaft 306. The shaft 306 is supported at a pair of spaced positions by the plate 292 and by a mounting plate 307 for rotary movement relative to the plates. A gear 308 (Figures 3 and 8) is also mounted on the shaft 306 and is in mesh with a gear 310 carried by a shaft 312. The shaft 312 is also supported by the plates 292 and 307 at a pair of spaced positions for rotary movement relative to the plates.

A permanent magnet 314 is also carried by the shaft 312 at the lower end of the shaft and is disposed above the movable contact of a switch 316. The switch 316 is positioned within a tube 318 which fits into a socket in the bottom retainer 12. The tube 318 is adapted to be closed by a threaded plug 320 and is fixedly positioned within the socket in the retainer 12 as by a set screw 322. In this way, the tube 318 becomes sealed against the passage of grime and dust into the tube to produce a deterioration in the operation of the switch 316. Wires 324 extend into the tube 318 for connection to the contacts of the switch 316.

The shaft 306 also carries a bevel gear 326 which is in mesh with a bevel gear 328 mounted on a shaft 330. A disc 332 (Figures 1 and 8) and a pawl 334 (Figure 8) are also mounted on the shaft 330 for rotation with the shaft. The shaft 330 also carries a cylinder 336 (Figures 1 and 8) having a plurality of decimal integers from "0" to "9" painted at spaced intervals along the periphery of the disc in the order of the ascending value of the integers.

The pawl 334 is adapted to engage a second disc on a second shaft to advance the disc every time that the pawl rotates through a complete revolution. By providing a plurality of discs corresponding to the disc 332 and by coupling each disc to the next disc by a pawl corresponding to the pawl 334, an indication can be provided in decimal form as to the number of revolutions of the shaft 330. These indications are provided on successive cylinders corresponding to the cylinder 336. The indications for successive decimal digits can be seen through windows 338 in Figure 1.

In addition to carrying the gear 310 and the rotatable magnet 314, the shaft 312 also carries a translucent disc 340 (Figure 4) having an opaque spot on one face. The disc 340 is positioned between a phototube 342 and a light source such as a bulb 344. The photo tube 342 is supported as by a bracket 346 on the mounting plate 307. The light bulb 344 extends downwardly from a cover plate 348 (Figures 4, 6 and 8) in supported relationship to the plate.

The cover plate 348 supports the meters 170 and 286 (Figure 1) as well as the light bulb 344 (Figure 4). The cover plate 348 is maintained in part in fixed and proper position by spacers 350 (Figures 4 and 8) having threaded portions which screw into the boss 68. The cover plate 348 is also maintained in part in fixed and proper position by seals 352 made from a suitably resilient material such as rubber and disposed between the plate and the casing 10.

Studs 354 (Figures 4 and 8) extend through holes in the casing 10 and in the seal 352 for threaded engagement with the spacer 350. Grommets (Figure 4) 356 are disposed in enveloping relationship to the portions of the studs 354 extending through the hole in the casing 10 and are provided with lips which are adapted to be clinched to the walls of the casing. O-rings 360 made from a suitable material such as rubber are disposed on the studs 354 between the grommets 356 and the head of the studs to provide seals.

The apparatus constituting this invention in the first step operates to provide continuous signals representing an output quantity such as the pressure of the fluid flowing through the pipe or member 146. The first portion of this apparatus operates to measure the amount of fluid pressure by directing a portion of the fluid in the pipe 146 into pipe 142 (Figure 1) and the port 138 into the bellows 134. This causes the bellows 134 to expand toward the left in Figure 1 by an amount dependent upon the pressure of the fluid. As the bellows 134 expands, it drives the arm 132 in a counterclockwise direction about the pin 130 as a fulcrum.

The pin 130 (Figure 1) follows the movement of the arm 136 and in turn drives the linkage 128 in a counterclockwise direction as the pressure of the fluid flowing through the pipe 146 increases. This causes the drive rod 122 to move toward the right in Figure 1 through a distance related to the expansion of the bellows 134. The drive rod 122 in turn drives the arm 120 in a clockwise direction through an angle related to its linear movement in accordance with increases in the pressure of the fluid flowing through the pipe 146. The arm 120 pivots about the shaft 110 as a fulcrum and drives the shaft through an angular distance related to its pivotal movements.

Since the rod 150 (Figures 1 and 6) is coupled to the shaft 110 as by extending through a hole in the shaft, it pivots in a clockwise direction in Figure 1 as the shaft rotates. This causes the rod 150 to drive the linkage 154 toward the right in Figures 1 and 2 to represent increases in the pressure of the fluid flowing through the pipe 146. The linkage 154 in turn drives the arm 156 (Figure 2) in a clockwise direction about the pin 158 as a fulcrum when the fluid pressure increases. Since the arm 156 and the gear sector 160 are both fixedly disposed on the pin 158, the gear sector 160 pivots in a clockwise direction about the pin 158 as a fulcrum through an angular distance related to the pivotal movements of the arm.

As the gear sector 160 pivots, it drives the pinion 162 (Figure 2), which in turn drives the pointer 164 in Figure 1 against the action of the spiral hairspring 166. In this way, the pointer 164 becomes pivoted in a clockwise direction through an angle related to the pressure of the fluid flowing through the pipe 146. By including such members as the rod 150, the linkage 154, the arm 156, the gear sector 160 and the pinion 162, the movements of the rod 150 becomes considerably amplified when they are transmitted to the pointer 164. This causes sensitive signals of the pressure of the fluid in the pipe 146 to be indicated by the pointer 164 in the meter 170.

The arm 106 (Figures 3 and 7) follows the movements of the shaft 110 and pivots in a clockwise direction with the shaft as the pressure of the fluid flowing through the pipe 146 increases. As the arm 106 pivots in a clockwise direction, it drives the linkage 100 toward the left in Figures 3 and 7 because of the coupling provided between the arm and the linkage by the spring member 105 and the ball 104. The linkage 100 in turn drives the plate 54 toward the left in Figures 3 and 7 because of its coupled relationship to the plate through the spring member 98. The plate 54 is freely movable since it is disposed on the balls 56 and 58 (Figure 3).

The movement of the plate 54 is controlled in part by the linkages 72 and 74 (Figures 3 and 7). For example as the arm 106 and the linkage 100 drive the plate 54 toward the left in Figures 3 and 7, the linkage 72 pivots in a clockwise direction in these figures because of its fulcrum on the boss 80. The clockwise pivotal movement of the linkage 72 in Figures 3 and 7 causes the portion of the plate 30 adjacent the linkage to move toward the left and toward the boss 80 in Figures 3 and 7.

Figures 10, 11, 13:
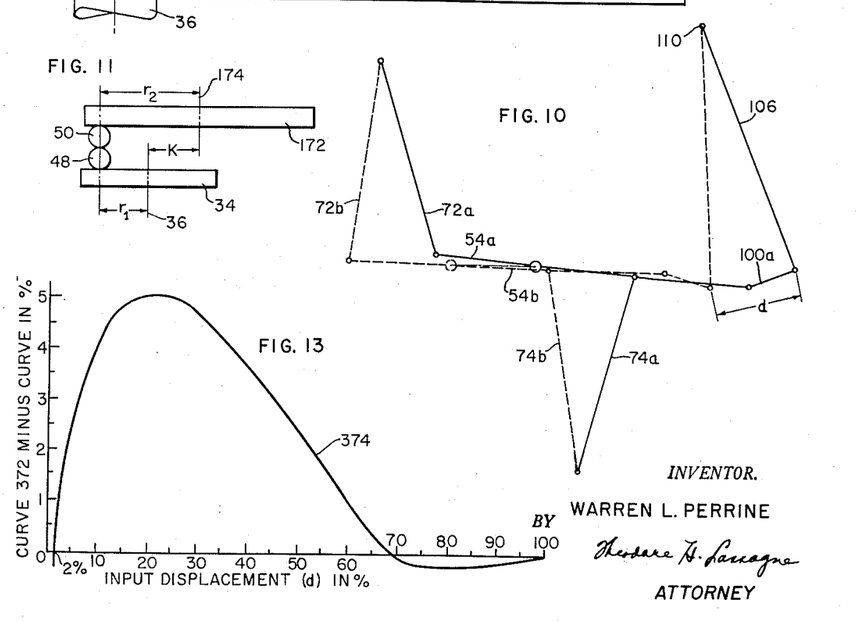
Figure 10 is a plan view schematically illustrating the operation of certain members shown in the previous figures, the members being shown in solid lines to represent one position and in broken lines to represent a second position.
Figure 11 is a schematic elevational view of certain important members previously shown in elevation in Figure 4 and illustrates the relative distances between these members for purposes of subsequent discussion.
Figure 13 illustrates a curve showing on an enlarged scale the difference between the two curves shown in Figure 12 and representing the correction obtained by the inclusion of certain members shown in Figures 1 to 9, inclusive.

The clockwise movement of the linkage 72 and the corresponding movement of the plate 54 are illustrated schematically in Figure 10. In that figure, the plate 54 and other members are represented schematically by single lines for purposes of explanation. Initial positions of the plate 54 and the linkage 72 are represented in solid lines in Figure 10 by the numerals 54a and 72a. This position corresponds to a relatively low flow of fluid through the pipe 146. The approximate positions of the plate 54 and the linkage 72 for high pressures in the pipe 146 is represented by broken lines in Figure 10 by the numerals 54b and 72b.

At the same time that the linkage 72 is pivoting in a clockwise direction in Figures 3 and 7, the linkage 74 is pivoting in a counterclockwise direction in these figures. The linkage is pivoting in a counterclockwise direction because of the fulcrum provided by the spring member 86 and the ball 88 on the boss 70 (Figure 3). This may be seen in Figure 10. In Figure 10, the position of the linkage 74 for a low fluid pressure is indicated in solid lines at 74a. The position of the linkage 74 for a high fluid pressure is indicated in broken lines at 74b in Figure 10. The pivotal movement of the linkage 74 in a counterclockwise direction in Figures 3 and 10 causes the portion of the plate 54 adjacent the linkages to move toward the left and toward the boss 70 in Figures 3 and 7.

The movement of the linkage 74 toward the boss 70 corresponds to the movement of the linkage 72 toward the boss 80. These movements are substantially equal since the effective pivotal lengths of the linkages 72 and 74 are substantially equal. Since the linkage 72 pivots toward the boss 80 and the linkage 74 pivots toward the boss 70 in Figures 3 and 7, the effective pivotal movement of the linkages in the direction of the bosses becomes cancelled at a position intermediate between the linkages. This position corresponds to the centers of the balls 48 and 50. In this way, the balls 48 and 50 and the intermediate position of the plate 54 move linearly toward the left in Figures 3 and 7 as the linkages 72 and 74 move the plate toward the left in these figures. This movement is in a radial direction relative to the gear 34.

As previously described, the motor 30 in Figure 1 rotates the shaft 28 and the gear 26 at a rate representing an independent quantity. For example, the motor 30 may rotate the shaft 28 and the gear 26 at a substantially constant rate to represent an independent quantity such as time. The gear 26 in turn drives the gear 20 at a substantially constant rate in Figures 1, 3 and 4 when the independent quantity represents time. Because of the disposition of the gears 20 and 32 on the shaft 16, the gear 32 in turn drives the gear 34 at a substantially constant rate when the independent quantity represents time.

Since the ball 48 contacts the gear 34, it follows the movements of the gear. Thus, as the gear 34 rotates, it drives the ball 48 at an angular rate proportionate to the rotation of the gear. The ball 48 also rotates at any instant at an angular rate dependent upon its instantaneous radial positioning on the gear 34. In this way, the position of the ball 48 represents the integration of the radial position of the ball on the gear 34 with respect to variations in the independent quantity such as time.

The ball 50 (Figures 4 and 7) follows the movements of the ball 48 since it contacts the ball 48. The ball 50 is able to accurately follow the movements of the ball 48 since it has proper contact with the ball 48 because of the resilient properties of the sleeve 52. The resilient properties of the sleeve 52 also cause the movements of the ball 48 to be accurately transmitted to the ball 50 by preventing skidding of the balls. The ball 50 in turn drives the gear 172 through angular movements corresponding to the rotation of the roller. The rotary movements of the gear 172 represent the integral with respect to time of the square root in the pressure of the fluid flowing through the orifice 148 in the pipe 146.

The operation of the above apparatus may be further seen from the schematic representation shown in Figure 11. As will be seen in Figure 11, the center of the gear 34 may be considered as being separated at any instant by a distance $r_1$ from the position at which the ball 48 contacts the gear. Similarly, the position at which the ball 50 contacts gear 172 may be considered as being separated at any instant by a distance $r_2$ from the center of said gear 172.

Since the angular movement of the gear 34 is transmitted through the balls 48 and 50 to the gear 172, the surface movement along the path of contact between ball 50 and gear 172 at any instant is equal to the surface movement along the path of its contact with ball 48 of the gear 34 at the same instant. For this reason, $$2^{\pi}r_1R_1 = 2^{\pi}r_2R_2 \qquad (1)$$

where $R_1$ = the rate of angular movement of the gear 34 at any instant; and
$R_2$ = the rate of angular movement of the gear 172 at the same instant.

Solving Equation 1 for $R_2$ $$R_2 = \frac{2^{\pi}r_1R_1}{2^{\pi}r_2} = \frac{r_1R_1}{r_2} \qquad (2)$$

As will be seen from the schematic representation of Figure 11, the horizontal distance between the radial centers of the gears 34 and 172 is a constant distance which may be designated as $k$. It will be further seen that the horizontal distance $r_2$ may be designated as $$r_2 = r_1 + K \qquad (3)$$

Substituting Equation 3 in Equation 2

$$R_2 = \frac{r_1R_1}{r_1 + K} \qquad (4)$$

Apparatus for operating in accordance with the logic expressed in Equation 4 is described and claimed in co-pending application Serial Number 511,328, filed May 26, 1955, by me.

Figure 12:
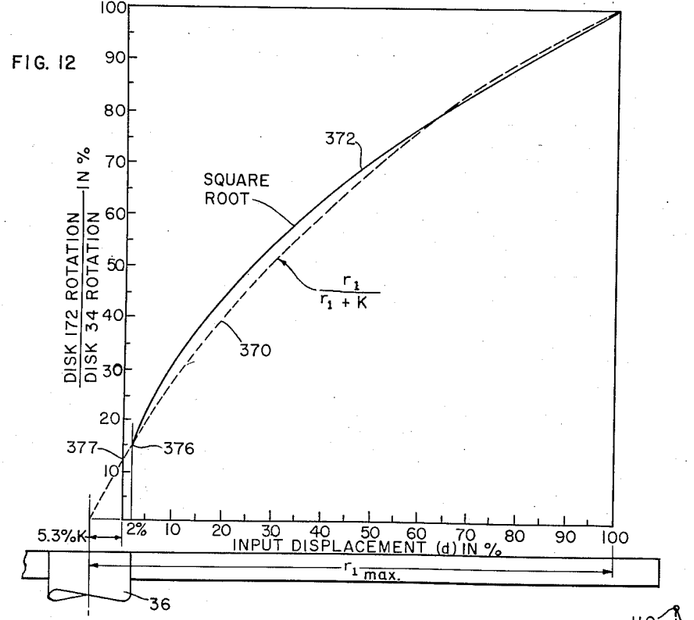
Figure 12 illustrates a pair of curves, one showing in a solid line the square root of a quantity and the other showing in broken lines a curve generated by certain components in the integrating apparatus to approximate the square root value.

By choosing a particular value for $k$ in Equation 4 the angular speed $R_2$ of the gear 172 may be made to approximate a square root function of the value of $r_1$. This optimum value for $k$ has been found to be approximately 0.324 inch when various members such as the linkages 72 and 74 have the parameters described above. By using such a value for $k$, a curve indicated in broken lines at 370 in Figure 12 is seen to be generated. The horizontal distance from the axis of the curve 370 in Figure 12 represents the horizontal distance between the radial centers of the ball 48 and the gear 34. The maximum horizontal distance shown in Figure 12 represents a value of $r_1 = k$ where $r_1$ and $k$ have previously been defined. The vertical distance from the axis of the curve represents the ratio $$\frac{r_1}{r_1 + K}$$

as expressed above in Equation 4.

As will be seen in Figure 12, the curve 370 approximates a curve 372 shown in solid lines and representing a true square root function. The horizontal distance from the axis of the curve 372 represents the displacement of the balls 48 and 50 radially from the center of the gear 34. The vertical distance from the axis of the curve 372 represents the square root of the horizontal value in per cent of full scale. As will be seen, the curves 370 and 372 intersect at a position approximately two percent of full scale along the horizontal axis. This represents the radius of the pin 36 (best seen in Figure 4). From a practical standpoint, this can be considered as being near the zero position for the movement of the balls 48 and 50 along the horizontal axis represented by the upper face of the gear 34. By providing such a zero position, the considerable difference between the curves 370 and 372 in the range to the left of the zero position in Figure 12 can be avoided.

The maximum error between the curves 370 and 372 will be seen at any position in Figure 12 to be less than five percent. This error is shown in magnified form for each position of the balls 48 and 50 by a curve 374 in Figure 13. Practically all of the error is compensated by members including the linkage 100 between the arm 106 and the plate 54. The compensation provided by the linkage 100 may be seen from the following discussion. It will be seen in Figure 11 that a steeply increasing amount of compensation is needed as the input to the shaft 110 and the linkage 100 initially increases from a low value. This is obtained by initially disposing the linkage 100 in a position indicated schematically by a solid line at 100a in Figure 10. In this position, the linkage 100 has a component of movement toward the left in Figures 3, 8 and 10.

The component of movement by the linkage 100 toward the left in Figure 10 continues until the linkage adopts a position substantially parallel to the front wall of the casing 10. Since the plate 54 follows the movement of the linkage 100 toward the left in Figures 3, 7, and 10, the plate receives a compensatory movement to correct for the error represented by the curve 374 in Figure 13. This compensatory movement is in addition to the pivotal movements imparted to the plate 54 by the arm 106. The compensatory movement of the plate 54 is on a cumulative basis until the linkage 100 becomes substantially parallel to the front wall of the casing 10. This corresponds to a maximum value of the curve 374 in Figure 13.

As the arm 106 continues to pivot in a clockwise direction in Figures 3 and 7 in response to increase in pressure of fluid in the pipe 146, it pivots the linkage 100 in a clockwise direction. This causes the linkage 100 to pivot with a component toward the right in Figures 3, 7 and 10 after it has reached a position substantially parallel to the front wall of the casing 10. The movement of the linkage 100 with a component toward the right in Figures 3, 7 and 10 causes the cumulative compensation provided by the linkage 100 to decrease. This is in accordance with the portion of the curve 374 in Figure 13 decreasing from a maximum value toward a value of "0."

It should be appreciated that the above discussion relating to the correction of the error shown in magnified form in Figure 13 is accomplished by other members in addition to the linkage 100. These members include the arm 106, the plate 54 and the linkages 72 and 74. As a result of the combined action of these various members, a maximum error of 0.1% or less can be obtained for every value along the abscissa of the curves shown in Figures 12 and 13 in the conversion of the fluid pressure to a square root value. For most values along the abscissa of the curves shown in Figures 12 and 13, the error is less than 0.1%. Since the value being measured is generally fluctuating, the error can usually average as to a value less than 0.1%.

In order to prevent any rotation of the balls 48 and 50 for a substantially zero input to the arm 106 and the linkage 100, a decoupling mechanism is included. This decoupling mechanism is included so that no output will be transmitted to the gear 172 when no input motion is imparted to the arm 106 and the linkage 100. The pin 36 (Figure 4) provides such a decoupling action by remaining stationary while the gear 34 is rotating. Because of its stationary disposition, the pin 36 prevents the ball 48 from rotating when the ball is contacting the pin. The ball cannot rotate even while the gear 34 is rotating as long as the ball contacts the pin 36. This prevents the motion of the gear 34 from being transmitted through the balls 48 and 50 to the gear 172 and to other members coupled to the gear. In this way, no output measurements are obtained until the measurements approach a value 377 in Figure 12.

As will be seen in Figure 12, a considerable difference exists in the portion of the curves 370 and 372 to the left of the value 377 in the figure. By preventing any output from being obtained until the value 377 in Figure 12 is approached, errors resulting from the differences in the curves 370 and 372 in the region to the left of the value 377 may be avoided or at least minimized.

Ordinarily, the measurements would be started at a position 376 in Figure 12 since this position corresponds to the radius of the pin 36, as indicated schematically in Figure 12. By tapering the upper surface of the pin 36, the measurements are started at the position 377 in Figure 12. The reason is that the position at which the ball 48 first contacts the pin 36 is closer to the center of the pin when the upper surface of the pin is tapered than when the upper surface of the pin is not tapered. The measurements in the region between the positions 377 and 376 in Figure 12 are not necessarily of complete accuracy but at least they are more accurate than if no measurements at all are made in this region.

The accuracy of the measurements in the region near the values 376 and 377 is further increased by providing the notches 37 in the pin 36 since the notches tend to facilitate the movement of the roller 48 from the pin to the gear 34 as the fluid pressure being measured increases from a low value. When the ball 48 moves into the notch 37, it is able to move upwardly along the inclined surface of the notch to the flat portion on the upper face of the notch. In this way, the notches 37 tend to counteract any adverse effects which the taper on the upper surface of the pin 36 may have in delaying the movement of the ball 48 from the pin to the gear as the drop in fluid pressure increases at low values. Furthermore, starting the measurements at the value 377 does not produce any appreciable errors because of the low values in the region between the positions 377 and 376. As previously explained, the total error is generally less than 0.1% even though the measurements in the region between the positions 376 and 377 may not be of a high accuracy.

The gear 172 drives the gear 190 in Figures 3 and 4 in accordance with its own angular movements. Since the gears 190 and 194 are both mounted on the shaft 192, the rotary movements of the gear 190 cause the gear 194 to drive the gear 196. The gear 196 in turn drives the gear 198, which corresponds in function to the gear 34. Because of the disposition of the ball 206 (Figure 4) on the gear 198, the ball 206 moves through an angular distance related to the angular movements of the gear and to its radial disposition on the gear.

The radial movements of the ball 206 on the gear 198 are controlled by the drop in pressure of the fluid as it flows through the orifice 148 in the pipe 146. Since the fluid flows in a direction toward the right in Figure 1, the pressure of the fluid passing through the pipe 270 is greater than the pressure of the fluid passing through the pipe 268. This difference in pressure causes the fluid passing through the pipe 270 to act upon the bellows 256 with a greater force than the force which the fluid passing through the pipe 268 exerts on the bellows 254. By exerting a greater force on the bellows 256 than the bellows 254, the bellows 256 becomes contracted by a greater amount than the bellows 254. This assembly provides a second sensing means coupled to the orifice 148 for providing continuous signals representing the drop in pressure of the fluid at every instant as the fluid flows through the orifice 148. This causes the drive rod 252 to move toward the left in Figure 1 against the action of springs (not shown) which exert a restoring force to position the rod in a neutral position.

When the drive rod 252 moves toward the left in Figure 1, it carries the arm 250 with it. The arm 250 pivots on a pin common to the linkage 248 and drives the linkage in a counterclockwise direction in Figure 1. This causes the rod 246 to move toward the right in Figure 1 and to pivot the arm 244 about the shaft 240 as a fulcrum. Since the arm 244 is rigidly mounted on the shaft 240, the shaft rotates in a clockwise direction in accordance with the movements of the arm in that direction. The shaft 240 in turn drives the pointer 284 (Figure 1) through various members including the rod 280 (Figures 1 and 9) so that the meter 286 (Figure 1) indicates the drop in pressure of the fluid flowing through the orifice 148.

The arm 236 (Figures 3 and 9) follows the movements of the shaft 240 and rotates in a clockwise direction in Figure 3. This causes the plate 212 to be moved toward the left in Figure 3 because of the coupling of the plate to the arm 236 through the linkage 234. As the plate 212 moves toward the left in Figure 3, the portion of the plate between the ball 208 and the linkage 216 pivots in a direction toward the boss 228 and the portion of the plate between the linkage 214 and the ball 208 pivots toward the boss 220. This causes the movements of the plate in a direction between the bosses 228 and 220 to cancel at an intermediate position between the linkages 214 and 216 such that a linear movement results at this intermediate position. This intermediate position corresponds to the centers of the balls 206 and 208. The linear movement of the plate 212 and of the balls 208 and 206 occurs along a radial path extending from the center of the gear 198.

Since the ball 206 rests on the gear 198 (Figure 4), it rotates with the gear. The angular movements of the ball 206 at any instant are related to the angular movements of the gear 198 and to the radial position of the ball on the gear. The ball 208 moves at each instant at an angular rate corresponding to the movements of the ball 206 and drives the gear 288 at an angular speed dependent upon its own angular movement. The center of the gear 288 is separated from the center of the pin 202 by a distance corresponding to the separation between the centers of the gears 172 and 34. This causes the movement of the gear 288 to have the same relationship to the movement of the gear 198 as has been set forth fully above in Equations 1 to 4, inclusive. Because of this, the movements of the gear 288 represent square root values of the information introduced to the gear 198.

As previously described the gear 198 is driven by the gear 172 at an angular rate representing the square root of the fluid pressure in the pipe 146 as this square root value is integrated with respect to the independent quantity such as time. Since the gear 198 moves angularly in accordance with the integral quantity from the gear 172, this quantity in effect serves as the independent quantity of the integral being obtained by the operation of the various members including the gear 198, the balls 206 and 208, the plate 212 and the gear 288. The dependent quantity of this second integral is represented by the radial movements of the balls 206 and 208 along the gear 198. These radial movements represent the drop in pressure of the fluid as it flows through the orifice 148 in the pipe 146.

The various members including the gear 198, the balls 206 and 208, the plate 212 and the gear 288 operate on the drop in fluid pressure to convert this quantity into a square root value. The members also integrate this square root value with respect to the independent quantity represented by the movements of the gear 198. In this way, the angular movements of the gear 288 are made to represent the following quantity:

$$F = C\int_0^t \sqrt{P}\sqrt{\Delta P}\, dt \quad (5)$$

where
- $F=$ the total amount of fluid flowing through the pipe 146 until any particular instant;
- $P=$ the pressure of the fluid flowing through the pipe 146 at any particular instant;
- $\Delta P=$ the drop in the pressure of the fluid at the particular instant as the fluid flows through the orifice 148 in the pipe 146;
- $dt=$ an infinitesimal increase in the independent quantity such as time;
- $t=$ the time from the institution of the measurements to the particular instant; and
- $c=$ a constant dependent upon such factors as the specific gravity of the fluid and the size of the orifice 148 in Figure 1.

The angular movements of the gear 288 are indicated in various ways by the operation of certain members included in the apparatus constituting this invention. For example, the gear 288 drives the gear 304 (Figures 3 and 8) mounted on the shaft 306, and the gear 308 mounted on the shaft 306 in turn drives the gear 310. Since the magnet 314 is mounted on the same shaft as the gear 310, the magnet rotates in accordance with the movements of the gear 288. The magnet 314 has a pair of poles at diametrically opposite positions on its periphery such that, in every revolution of the magnet, both poles exert a force on the movable contact of the switch 316 in a direction for closing the switch. This causes the switch 316 to become closed twice in each revolution of the magnet. When the switch 316 closes, a signal passes through the wires 324 (Figure 8) to counting apparatus (not shown).

This apparatus may be conventional apparatus for indicating in digital form the number of times the switch 316 closes. In this way, the output represented by the angular movements of the gear 288 can be converted into a magnetic form to provide digital indications.

The shaft 312 carries the translucent disc 340 (Figure 4) as well as the magnet 314. As previously described, the disc 340 has an opaque spot on one face at one position along its periphery. As the translucent disc 340 rotates, the opaque spot on the disc becomes positioned between the bulb 344 and the photo tube 342 at one instant in each revolution of the disc. This causes the light from the bulb 344 to be prevented at one instant from reaching the photo tube 342 such that the signal in the photo tube becomes instantaneously interrupted. The number of interruptions in the signal from the photo tube 342 can be counted by suitable apparatus (not shown) so as to provide an indication in digital form as to the angular movements of the gear 288.

As previously described, the gear 288 drives the gear 304 (Figures 3 and 8) mounted on the shaft 306. Since the bevel gear 326 (Figure 8) is also mounted on the shaft 306, it drives the bevel gear 328 (Figures 3 and 8) through an angular distance related to the movements of the gear 288. The disc 332, the pawl 334 and the cylinder 336 follow the movements of the gear 328 since all of these members are mounted on the shaft 330. As the cylinder 336 rotates, successive numbers from "0" to "9" move past the window 338 in Figure 1 to indicate the angle through which the cylinder has rotated at any instant.

After each revolution of the pawl 334, the pawl engages the disc mounted on the next shaft and corresponding to the disc 332 on the shaft 330. When this engagement occurs, the pawl 334 rotates the next disc through substantially one tenth of a revolution. In this way, the cylinder mounted on the next shaft and corresponding to the cylinder 336 on the shaft 330 indicates the value of the "tens" digit just as the cylinder 336 indicates the value of the "units" digit. In like manner, successive cylinders may indicate at any instant the value of the "hundreds," "thousands," etc. digit as shown in Figure 1. In that figure, a decimal value of "771141" is indicated in the windows 338.

As may be seen from the previous paragraphs, the angular movements of the gear 288 can be measured and indicated in a number of different ways to represent the total amount of fluid flowing through the orifice 148 until any particular instant. The fluid flow represented by the movements of the gear 288 can also be easily converted to indications representing the average rate of fluid flow by measuring the fluid flow and dividing the fluid flow by the time until the particular instant. Since the average rate of fluid flow can be measured, the indications representing such average rate can be used to regulate the subsequent flow of fluid in complex systems where the fluid flow constitutes only one of a number of parameters in an overall operation.

The apparatus described above gives accurate indications because of its unique construction and operation as described above. The apparatus also gives accurate indications because of the minimum amount of friction generated in the equipment. This results in part from the pivotable coupling produced between the various members by the spring members and balls such as the spring member 76 and the ball 78 in Figure 3. It also results in part from the particular way in which the operative relationship of particular members such as the plate 176 and the gear 34 can be accurately controlled relative to one another by adjusting the position of the screw 186 in Figure 6.

When the position of the screw 186 becomes adjusted, a corresponding adjustment is produced in the constraint of the spring 188. By adjusting the constraint of the spring 188, the pivotal force exerted by the spring on the plate 176 becomes varied. The adjustment in the force exerted by the spring 188 on the plate 176 acts to press the plate with a proper force against the balls 184 so that the balls 180 will move easily but without any friction between the balls, the plate and the gear 288.

The disposition of the plate 176 is adjusted so that the plate will be substantially parallel to the gear 34 to a very high degree of accuracy. Preferably, the plate 176 should be parallel to the gear 34 with a tolerance of less than approximately 0.001 inch per inch of length along the plate and the gear. Since the gear 172 is substantially parallel to the plate 176 because of its separation from the plate by the balls 180, the gear 176 becomes substantially parallel to the gear 34 when the plate and the gear 34 become parallel. Obtaining a parallel disposition of the gears 34 and 176 is important in producing an optimum coupling between the gears through the balls 48 and 50 even when the radial positioning of the balls relative to the gears becomes varied.

The plate 176 can be accurately positioned with respect to the gear 34 because of the relatively soft material such as aluminum from which the bosses such as the boss 70 are made. Since the bosses such as the boss 70 are relatively soft, they yield to the balls 180 when the balls are initially disposed in the sockets in the bosses and the plate 176 is pressed against the balls. This tends to eliminate any undesirable positioning of the plate 176 by making the balls 184 seat properly in the bosses and by disposing the plate properly against the balls and in parallel relationship to the gear 34. Since the plate 176 is positioned on the balls 184, a vertical play of the plate can take place when certain irregularities occur in the shape of various members such as in the balls 180 pressing against the plate. This vertical play is desirable to minimize friction between various parts.

Certain other relationships between various members including the gears 34 and 172 are important. For example, the distance between the centers of the gears 34 and 172 should preferably be accurate to a tolerance of less than approximately 0.002 inch. Furthermore, the balls 48 and 50 should preferably contact the gears 34 and 172 along a horizontal extension of the radial line between the centers of the gears to an accuracy having a tolerance of less than approximately 0.002 inch.

It should be appreciated that the members including the plate 292, the gear 288 and the gear 198 in Figure 4 should be positioned to the same accuracies relative to one another as those described above for the plate 176, the gear 172 and the gear 34. The relationship between these members is further advantageous in that the members can be easily disassembled. For example, various members including the plate 176, the cage 178, the gear 172 and the gear 34 can be easily disassembled by removing the screw 186 from its threaded socket in the boss 70.

It should be appreciated that the apparatus described above does not necessarily indicate the fluid flow but only a value directly proportional to the fluid flow. The reason is that the apparatus does not include the value of the constant "C" in solving Equation 5. However, the value of the constant "C" can be easily included for a known set of parameters by including a pair of gears having a ratio representing C. This pair of gears could be included in the input side of the apparatus such as in coupled relationship between the gears 26 and 20 in Figure 4. By including such a pair of gears, the angular movements of the gear 288 would directly represent the fluid flow for the particular set of parameters.

It should also be appreciated that the above apparatus is particularly adapted to measure the flow of gases. This results from the fact that an appreciable drop in fluid pressure occurs for gases so that a significant measurement representing the flow of the gas as expressed in Equation 5 can be obtained. It would also be possible to measure the flow of liquids with the above apparatus, especially if inputs representing certain parameters such as the specific gravity of the liquid were inserted manually into the arm 150 in place of the measurements representing the drop in fluid pressure.

Certain other possibilities should also be appreciated. The above discussion has proceeded on the basis of generating square root functions of certain parameters such as fluid pressure and the drop in fluid pressure. For certain gases such as steam, discrepancies in the measurements of the fluid flow may be obtained when the fluid flow is determined by using values representing fluid pressure and the drop in fluid pressure. These discrepancies can be corrected by adjusting certain parameters such as the distance between the centers of the gears 34 and 172 and the lengths of the linkages 72, 74 and 100. The parameters can be adjusted to convert measurements such as fluid pressure and the drop in fluid pressure into functions other than square root values.

The apparatus described above has several other important advantages. It provides continuous and accurate indications of a parameter such as the flow of fluid through a member. It provides continuous indications of a value directly related to the fluid flow by measuring the pressure of the fluid and the drop in the pressure of the fluid as the fluid flows through an orifice. The apparatus converts these indications to square root values and then integrates the values with respect to time to obtain output indications directly related to the fluid flow.

I claim:

1. In combination for measuring the flow of fluid through a member having an orifice, first sensing means coupled to the orifice for providing continuous signals representing at every instant the pressure of the fluid flowing through the member at that instant, means including a first input shaft for converting the signals of the fluid pressure at every instant into corresponding rotary dispositions of the first input shaft, means including a second input shaft for obtaining a rotary movement of the second input shaft to represent time, means including a first pair of rotary members having their centers separated from each other by a particular distance and coupled to the first and second input shafts for converting the rotary movements of the input shafts into rotary movements of a particular one of the members in the pair in representation of the integral of the square root in fluid pressure with respect to time, second sensing means coupled to the orifice for providing continuous signals representing at every instant the drop in the pressure of the fluid as it flows through the orifice at that instant, means coupled to the last mentioned means and including a third input shaft for converting the signals of the drop in fluid pressure at every instant into corresponding rotary dispositions of the third input shaft at that instant, and means including a second pair of rotary members having their centers separated from each other by a particular distance and coupled to the third input shaft and to the particular one of the members in the first rotary pair for combining the rotary movements of the third input shaft and the rotary movements of the particular rotary member in the first pair at every instant to obtain rotary movements of a particular one of the members in the second pair in representation of a value related to the fluid flow.

2. In combination for measuring the flow of fluid through a member having an orifice, first sensing means coupled to the orifice for providing continuous signals representing at each instant the pressure of the fluid flowing through the member with the orifice at that instant, means including a first rotary member for providing a rotary movement of the first rotary member to represent an independent quantity such as time, a second rotary member having a center of movement separated by a particular distance from the center of movement of the first rotary member, means including coupling means disposed between the first and second rotary members and coupled to the first sensing means for movement at each instant in accordance with the indications of the fluid pressure for producing a rotary movement of the second member related to the disposition of the coupling means and the movements of the first rotary member at that instant, second sensing means coupled to the orifice for providing continuous signals representing at each instant the drop in pressure of the fluid flowing through the orifice at that instant, means including a third rotary member coupled to the second rotary member for rotary movement through an angular distance directly related to the movements of the second rotary member, a fourth rotary member having a center of rotary movement separated by a particular distance from the center of rotary movement of the third rotary member, and means including second coupling means disposed between the third and fourth rotary members and coupled to the second sensing means for movement at each instant in accordance with the continuous signals representing the drop in fluid pressure at that instant for producing a rotary movement of the fourth rotary member related to the disposition of the second coupling means and the movements of the third rotary member and in representation of a value related to the fluid flow.

3. In combination for measuring the flow of fluid through a member having an orifice, first sensing means coupled to the orifice for providing continuous signals representing the pressure of the fluid flowing through said member having an orifice at each instant, means including a first member rotatable through angular distances representing an independent quantity such as time, means including a first plate and a first plurality of linkages coupled to the first sensing means for providing linear movements of the plate at each instant at a particular position on the plate in accordance with the indications of fluid pressure at that instant, a second rotary member disposed at a particular radial distance from the first rotary member, means including first coupling means movable with said first plate at the particular position and disposed between the first and second rotary members for producing rotary movements of the second rotary member at each instant in accordance with the rotary movements of the first rotary member and with the linear movements of the plate at the particular position at that instant, second sensing means coupled to the orifice for providing continuous signals representing the drop in pressure of the fluid flowing through the orifice at each instant, means including a third rotary member rotatable through angular distances related to the angular movements of the second rotary member at each instant, means including a second plate and a second plurality of linkages coupled to the second sensing means for providing linear movements of the plate at each instant at a particular position of the plate in accordance with the continuous signals representing the drop in fluid pressure at that instant, a fourth rotary member disposed at a particular radial distance from the third rotary member, and means including second coupling means movable with the plate at the particular position and disposed between the third and fourth rotary members for producing rotary movement of the fourth rotary member at each instant in accordance with the rotary movements of the third rotary member and with the linear movements of the second plate at the particular position at that instant and in representation of a value related to the fluid flow.

4. In combination for measuring the flow of fluid through a member having an orifice, first sensing means coupled to the orifice for providing continuous signals representing at each instant the pressure of the fluid flowing through the member, a base, a first rotatable member representing an independent quantity such as time, a first stationary pin attached to said base and mounted through said first rotatable member, a second rotatable member having its center separated by a particular distance from the center of said stationary pin, coupling means movably disposed between the first and second rotatable members, a linkage connected to said coupling means and to said continuous signal means, second sensing means coupled to the orifice for providing continuous signals representing at each instant the drop in pressure of the fluid flowing through said orifice, a second stationary pin attached to said base, a third rotatable member directly coupled to said second rotatable member, and mounted on said second pin, a fourth rotatable member having a center separated by a particular distance from the center of said third rotatable member, a second coupling means movably disposed between the third and fourth rotatable members, a linkage coupled to said second coupling means, said first and second stationary pins being bevelled across their respective tops and substantially flush at one point respectively with the surface of said first and fourth rotatable members, whereby a clutch action is provided between the first and second rotatable members and the third and fourth rotatable members to permit the first and fourth rotatable members to move at a constantly driven speed at all times, and the second and fourth rotatable members to remain motionless when the coupling means is located substantially at the center of said first and third mentioned rotary member.

5. In combination for measuring the flow of fluid through a member having an orifice, first sensing means for providing continuous signals representing at any instant the pressure of the fluid flowing through the member, a base, a first rotatable member representing an independent quantity such as time, a first stationary pin attached to said base and mounted through said first rotatable member, a second rotatable member having its center separated by a particular distance from the center of said stationary pin, coupling means movably disposed between the first and second rotatable members, a linkage connected to said coupling means and to said continuous signal means representing the pressure of the fluid flowing through said first mentioned member, second sensing means for providing continuous signals representing at any instant the drop in pressure of the fluid flowing through said orifice, a second stationary pin attached to said base, a third rotatable member directly coupled to said second rotatable member and mounted on said second pin, a fourth rotatable member having a center separated by a particular distance from the center of said third rotatable member, a second coupling means movably disposed between the third and fourth rotatable members, a plate mounted on each of said second and fourth rotatable members having a plurality of balls circumferentially disposed about and extending therethrough, a stationary plate bearing against said last mentioned balls pivotally mounted on said base, and resilient means urging said last mentioned plate against said balls whereby the second and fourth rotary members are continuously maintained in substantially frictionless alignment with said first and third rotatable members.

6. In combination for measuring the flow of fluid through a member having an orifice, first sensing means coupled to the orifice for providing continuous signals representing the pressure of the fluid flowing through the member at every instant, means responsive to the continuous signals representing the pressure of the fluid at every instant for converting these signals to continuous indications representing the square root of the fluid pressure at every instant, second sensing means coupled to the orifice for providing continuous signals representing the drop in the pressure of the fluid at every instant as the fluid flows through the orifice, means responsive to the continuous signals representing the drop in fluid pressure at every instant for converting the last mentioned signals into continuous indications representing the square root of the drop in fluid pressure at every instant, and integrating means responsive to the continuous signals representing the fluid pressure and the drop in fluid pressure at every instant for integrating the square root of the fluid pressure and the square root of the drop in fluid pressure at every instant to provide indications related to the total amount of fluid flowing through the orifice.

7. In combination for measuring the flow of fluid through a member having an orifice, first sensing means coupled to the orifice for providing continuous signals representing at every instant the pressure of the fluid flowing through the member at that instant, second sensing means coupled to the orifice for providing continuous signals representing at every instant the drop in the pressure of the fluid flowing through the orifice at that instant, means including a first rotary member for producing rotary movements of the first rotary member in representation of time, means including a second member coupled to the first rotary member and responsive to the signals representing the fluid pressure of the fluid flowing through said member having an orifice for combining the signals representing the fluid pressure and the rotary movements of the first rotary member at each instant to produce rotary movements of the second rotary member at that instant and to produce total rotary movements of the second rotary member in representation of the integral of the square root of fluid pressure with respect to time, means including a third rotary member coupled to the second rotary member and responsive to the signals representing the drop in fluid pressure through the orifice for combining the signals representing the drop in fluid pressure through the orifice and the rotary movements of the second rotary member at each instant to produce rotary movements of the third rotary member at each instant in representation of a value related to the fluid flow at that instant and to produce total rotary movements of the third member in representation of the total amount of fluid flowing through the orifice, and means coupled to the third member for determining the total rotary movements of the third member over a particular period of time to provide an indication as to the amount of fluid flowing through the orifice during that time.

8. In combination for measuring the flow of fluid through a member having an orifice, first sensing means coupled to the orifice for providing continuous signals representing at every instant the pressure of the fluid flowing through the member at that instant, means including a first rotary member for providing rotary movements of the first rotary member in representation of an independent quantity such as time, means including a second rotary member coupled to the first sensing means and to the first rotary member for converting the signals representing the pressure of the fluid flowing through said member at each instant into rotary movements of the second rotary member in representation of the integral of the square root of fluid pressure with respect to time, second sensing means coupled to the orifice for providing continuous signals representing at every instant the drop in the pressure of the fluid flowing through the orifice at that instant, and means including a third rotary member coupled to the last mentioned means and to the second rotary member for converting the continuous signals representing at every instant the drop in fluid pressure of the fluid flowing through the orifice and the time integral of the square root of fluid pressure into rotary movements of the third member in representation of a value related to the total amount of fluid flowing through the orifice.

9. In combination for measuring the flow of fluid through a member having an orifice, first sensing means coupled to the orifice and including a first rotatable shaft for providing a rotary disposition of the shaft on a continuous basis in representation at each instant of the pressure of the fluid flowing through the member at that instant, second sensing means coupled to the orifice and including a second rotatable shaft for providing a rotary disposition of the shaft on a continuous basis in representation at each instant of the drop in pressure of the fluid flowing through the orifice at that instant, first mechanical means coupled to the first shaft and including a first member for converting the rotary disposition of the first shaft at each instant into a linear disposition of the first member in representation of the square root of the fluid pressure, second mechanical means coupled to the second shaft and including a second member for converting the rotary disposition of the second member in representation of the square root of the drop in fluid pressure, third mechanical means coupled to the first mechanical means and including a third shaft for converting the linear disposition of the first member into a rotary movement of the third shaft to represent the integral with respect to time of the linear disposition of the first member, and fourth mechanical means coupled to the second mechanical means and to the third shaft and including a fourth shaft for converting the linear disposition of the second member into a rotary movement of the fourth shaft in accordance with the rotary movement of the third shaft to represent the integral of the linear disposition of the second member with respect to the rotary movements of the third shaft.

10. In combination for measuring the flow of fluid through a member having an orifice, first sensing means coupled to the orifice and including a first rotatable shaft for providing a rotary disposition of the shaft on a continuous basis in representation at each instant of the pressure of the fluid flowing through the member at that instant, second sensing means coupled to the orifice and including a second rotatable shaft for providing a rotary disposition of the shaft on a continuous basis in representation at each instant of the drop in pressure of the fluid flowing through the orifice at that instant, means including a third rotatable shaft for obtaining a rotation of the third shaft at a constant speed to represent time, a first ball-and-disc integrator coupled to the third shaft for rotary movements of the first integrator balls in accordance with the rotary movements of the third shaft and in accordance with the disposition of the balls, means including a first plurality of linkages responsive to the rotary disposition of the shaft and coupled to the balls in the first integrator for positioning the balls in the integrator at each instant to represent the square root of the fluid pressure at that instant, a second ball-and-disc integrator coupled to the first ball-and-disc integrator for rotary movement of the balls in the second integrator in accordance with the rotary movements of the balls in the first integrator and in accordance with the disposition of the second balls, and means including a second plurality of linkages responsive to the rotary disposition of the shaft and coupled to the balls in the second integrator for positioning the balls in the integrator at each instant to represent the square root of the drop in fluid pressure at that instant.

11. In combination for measuring the flow of fluid through a member having an orifice, first sensing means coupled to the member for providing continuous signals representing at each instant the pressure of the fluid flowing through the member at that instant, second sensing means coupled to the orifice for providing continuous signals representing at each instant the drop in pressure of the fluid flowing through the orifice at that instant, means for providing continuous signals representing time, means including a first integrator responsive to the continuous signals representing time and representing fluid pressure for operating upon these signals at each instant to provide signals representing the integral with respect to time of the square root of fluid pressure, and means including a second integrator responsive to the continuous signals representing the drop in fluid pressure and to the continuous signals from the first integrator for operating upon these signals at each instant to provide indications representing the total amount of fluid flowing through the member as determined by the integral with respect to time of the product of the square root of fluid pressure and the square root of the drop in fluid pressure.

12. In combination for measuring the flow of fluid through a member having an orifice, first sensing means coupled to the member and including a first rotatable shaft for providing a rotary disposition of the shaft on a continuous basis in representation at each instant of the pressure of the fluid flowing through the member at that instant, second sensing means coupled to the orifice and including a second rotatable shaft for providing a rotary disposition of the shaft on a continuous basis in representation at each instant of the drop in pressure of the fluid flowing through the orifice at that instant, a first plate, means including a first plurality of linkages coupled to the first shaft and to the first plate and including a pair of balancing linkages in the plurality for providing a movement of the plate in accordance with the rotary disposition of the shaft and for providing a linear movement of the plate at a particular position between the balancing linkages, a first pair of balls coupled to the first plate at the particular position for linear movement with the plate, means including a first disc for obtaining a rotary movement of the disc at a constant speed to represent time, the first disc being coupled to the first pair of balls to obtain a rotary movement of the balls in accordance with the rotary movements of the disc and in accordance with the linear disposition of the balls, a second disc coupled to the first pair of balls and having a particular radial disposition relative to the balls to obtain a rotary movement of the second disc in representation of the integral with respect to time of the fluid pressure, a second plate, means including a second plurality of linkages coupled to the second shaft and to the second plate and including a pair of balancing linkages in the plurality for providing a movement of the second plate in accordance with the rotary disposition of the second shaft and for providing a linear movement of the plate at a particular position between the balancing linkages, a second pair of balls coupled to the second plate at the particular position for linear movement with the plate, means including a third disc coupled to the second disc for obtaining a rotary movement of the third disc in accordance with the rotary movements of the second disc, the third disc being coupled to the second pair of balls to obtain a rotary movement of the balls in accordance with the rotary movement of the disc and in accordance with the linear disposition of the balls, and a fourth plate coupled to the second pair of balls and having a particular radial disposition relative to the balls to obtain a rotary movement of the fourth disc in representation of the integral of the quantity obtained from the rotary movements of the second disc and the square root of the drop in fluid pressure.

References Cited in the file of this patent
UNITED STATES PATENTS

| | | |
|---|---|---|
| 1,409,879 | Manley | Mar. 14, 1922 |
| 1,471,100 | Cherry | Oct. 16, 1923 |
| 1,894,449 | Sandross | Jan. 17, 1933 |
| 1,912,420 | Young | June 6, 1933 |
| 1,957,747 | Young | May 8, 1934 |
| 2,377,898 | Myers | June 12, 1945 |
| 2,505,521 | Boyajian | Apr. 25, 1950 |
| 2,689,684 | Laternser | Sept. 21, 1954 |
| 2,731,831 | Schaefer | Jan. 24, 1956 |

FOREIGN PATENTS

| | | |
|---|---|---|
| 521,140 | France | Mar. 2, 1921 |
| 386,771 | Germany | Jan. 15, 1922 |

OTHER REFERENCES

Computing Mechanisms and Linkages (Svoboda), McGraw-Hill, 1948, page 36 relied on.